United States Patent
Parada et al.

(10) Patent No.: US 10,424,317 B2
(45) Date of Patent: Sep. 24, 2019

(54) METHOD FOR MICROPHONE SELECTION AND MULTI-TALKER SEGMENTATION WITH AMBIENT AUTOMATED SPEECH RECOGNITION (ASR)

(71) Applicant: Nuance Communications, Inc., Burlington, MA (US)

(72) Inventors: Pablo Peso Parada, Berkshire (GB); Dushyant Sharma, Burlington, MA (US); Patrick Naylor, Berkshire (GB)

(73) Assignee: Nuance Communications, Inc., Burlington, MA (US)

( * ) Notice: Subject to any disclaimer, the term of this patent is extended or adjusted under 35 U.S.C. 154(b) by 76 days.

(21) Appl. No.: 15/403,481

(22) Filed: Jan. 11, 2017

(65) Prior Publication Data
US 2018/0075860 A1   Mar. 15, 2018

Related U.S. Application Data

(60) Provisional application No. 62/394,286, filed on Sep. 14, 2016.

(51) Int. Cl.
*G10L 21/0232* (2013.01)
*G10L 15/04* (2013.01)
(Continued)

(52) U.S. Cl.
CPC ......... *G10L 21/0232* (2013.01); *G10L 15/04* (2013.01); *G10L 17/06* (2013.01); *G10L 17/16* (2013.01); *G10L 21/028* (2013.01); *G10L 25/03* (2013.01); *H04R 1/406* (2013.01); *G10L 15/00* (2013.01); *G10L 25/84* (2013.01); *G10L 2021/02166* (2013.01)

(58) Field of Classification Search
CPC ............... G10L 21/0232; G10L 21/028; G10L 2021/02166; G10L 17/16; G10L 17/06; G10L 15/04; G10L 15/00; G10L 25/03; G10L 25/84; H04R 1/406
USPC ......................................................... 381/92
See application file for complete search history.

(56) References Cited

U.S. PATENT DOCUMENTS 9,560,446 B1 *   1/2017  Chang .................... H04R 3/005
2014/0286497 A1 * 9/2014  Thyssen ................. H04R 3/005
                                                 381/66

OTHER PUBLICATIONS

Tin Lay Nwe et al. "Speaker Clustering and Cluster Purification Methods for RT07 and RT09 Evaluation Meeting Data", IEEE Transactions on Audio, Speech and Language Processing, IEEE, vol. 20, No. 2, Feb. 1, 2012, pp. 461-473, XP011398127, ISSN: 1558-7916, DOI: 10.1109/TASL.2011.2159203 section III.A.

(Continued)

*Primary Examiner* — Ahmad F. Matar
*Assistant Examiner* — Sabrina Diaz
(74) *Attorney, Agent, or Firm* — Brian J. Colandreo; Michael T. Abramson; Holland & Knight LLP

(57) ABSTRACT

Disclosed methods and systems are directed to determining a best microphone pair and segmenting sound signals. The methods and systems may include receiving a collection of sound signals comprising speech from one or more audio sources (e.g., meeting participants) and/or background noise. The methods and systems may include calculating a TDOA and determining, based on the TDOA and via robust statistics, the best pair of microphones. The methods and systems may also include segmenting sound signals from multiple sources.

20 Claims, 16 Drawing Sheets

(51) Int. Cl.
  *G10L 17/16*  (2013.01)
  *G10L 21/028*  (2013.01)
  *H04R 1/40*  (2006.01)
  *G10L 17/06*  (2013.01)
  *G10L 25/03*  (2013.01)
  *G10L 21/0216*  (2013.01)
  *G10L 15/00*  (2013.01)
  *G10L 25/84*  (2013.01)

(56) References Cited

OTHER PUBLICATIONS

Hanwu Sun et al. "Speaker Diarization System on the 2007 Nist Richt Transcription Meeing Recognition Evaluation" SPIE, PO Box 10 Bellingham WA 98227-0010 USA, vol. 6777, Sep. 10, 2007, XP040248220, section 2.1.
Beatriz Martinez Gonzalez et al. "Selection of TDOA Parameters for MDM Speaker Diarization", Proceedings of Interspeech 2012, Sep. 13, 2012, XP055435349, sections 4.1-44.
Deepu Vijayasenan et al. "Speaker diarization of meetings based on large TDOA feature vectors", 2012 IEEE International Conference on Acoustics, Speech and Signal Processing (ICASSP 2012) : Kyoto, Japan, Mar. 25-30, 2012; [Proceedings], IEEE, Piscataway, NJ, Mar. 25, 2012, pp. 4173-4176, XP032228074, DOI: 10.1109/ICASSP.2012.6288838 ISBN: 978-1-4673-0045-2.
Jan. 4, 2018—(WO) International Search Report and Written Opinion—App PCT/US2017/051480.
K. Anguera Miro, S. Bozonnet, N. Evans, C. Fredouille, G. Friedland, and O. Vinyals, "Speaker diarization: a review of recent research," IEEE Trans. Audio, Speech, Lang. Process., vol. 20, No. 2, pp. 356-370, 2012.
T. Stafylakis and V. Katsouros, "A review of recent advances in speaker diarization with bayesian methods," in Speech and Language Technologies, I. Ipsic, Ed. Rijeka: INTECH Open Access Publisher, 2011, ch. 11, pp. 217-240.
R. Sinha, S. E. Tranter, M. J. F. Gales, and P. C. Woodland, "The Cambridge University Mar. 2005 speaker diarisation system," in Proc. European Conf. on Speech Communication and Technology, Lisbon, Portugal, Sep. 2005, pp. 2437-2440.
S. Tranter and D. Reynolds, "An overview of automatic speaker diarization systems," IEEE Trans. Audio, Speech, Lang. Process., vol. 14, pp. 1557-1565, 2006.
R. Milner, O. Saz, S. Deena, M. Doulaty, R. W. M. Ng, and T. Hain, "The 2015 sheffield system for longitudinal diarisation of broadcast media," in Proc. IEEE Workshop on Automatic Speech Recognition and Understanding (ASRU), Dec. 2015, pp. 632-638.
G. Sell and D. Garcia-Romero, "Speaker diarization with plda i-vector scoring and unsupervised calibration," in IEEE Spoken Language Technology Workshop (SLT), Dec. 2014, pp. 413-417.
D. Vijayasenan, F. Valente, and H. Bourlard, "An information theoretic combination of MFCC and TDOA features for speaker diarization," IEEE Trans. Audio, Speech, Lang. Process., vol. 19, No. 2, pp. 431-438, Feb. 2011.
N. Evans, C. Fredouille, and J.-F. Bonastre, "Speaker diarization using unsupervised discriminant analysis of inter-channel delay features," in Proc. IEEE International Conference on Acoustics, Speech and Signal Processing (ICASSP), Taipei, Taiwan, Apr. 2009, pp. 4061-4064.
T. Oku, S. Sato, A. Kobayashi, S. Homma, and T. Imai, "Low-latency speaker diarization based on bayesian information criterion with multiple phoneme classes," in Proc. IEEE International Conference on Acoustics, Speech and Signal Processing (ICASSP), Kyoto, Japan, Mar. 2012, pp. 4189-4192.
G. Schwarz et al., "Estimating the dimension of a model," The annals of statistics, vol. 6, No. 2, pp. 461-464, 1978.
T. Hori, S. Araki, T. Yoshioka, M. Fujimoto, S. Watanabe, T. Oba, A. Ogawa, K. Otsuka, D. Mikami, K. Kinoshita, T. Nakatani, A. Naka-mura, and J. Yamato, "Low-latency real-time meeting recognition and understanding using distant microphones and omni-directional camera," IEEE Trans. Audio, Speech, Lang. Process., vol. 20, No. 2, pp. 499-513, Feb. 2012.
X. Anguera, C. Wooters, and J. Hernando, "Acoustic beamforming for speaker diarization of meetings," IEEE Trans. Audio, Speech, Lang. Process., vol. 15, No. 7, pp. 2011-2022, Sep. 2007.
C. H. Knapp and G. C. Carter, "The generalized correlation method for estimation of time delay," IEEE Transactions on Acoustics, Speech and Signal Processing, vol. 24, No. 4, pp. 320-327, 1976.
E. El Khoury, C. Senac, and P. Joly, "Audiovisual diarization of people in video content," Multimedia Tools and Applications, vol. 68, No. 3, pp. 747-775, 2012.
G. McLachlan and T. Krishnan, The EM algorithm and extensions. New York: John Wiley & Sons, 2007, vol. 382.
B. W. Silverman, "Density estimation for statistics and data analysis," CRC press, 1986, vol. 26.
C. M. Bishop, "Pattern Recognition and Machine Learning (Information Science and Statistics)," Springer-Verlag New York, Inc., 2006.
D. Chauveau and D. R. Hunter, "ECM and MM algorithms for normal mixtures with constrained parameters," Aug. 2013, https://hal.archives-ouvertes.fr/hal-00625285.
L. Scrucca, "GA: A package for genetic algorithms in R," Journal of Statistical Software, vol. 53, No. 4, pp. 1-37, 2013. http://www.jstatsoft.org/v53/i04/.
K. P. Burnham and D. R. Anderson, Model selection and multimodel inference: a practical information-theoretic approach. Springer Science & Business Media, 2002.
C. Mitchell and L. Jamieson, "Modeling duration in a hidden markov model with the exponential family," in Acoustics, Speech, and Signal Processing, 1993. ICASSP-93., 1993 IEEE International Conference on, vol. 2, Apr. 1993, pp. 331-334.
C. R. Shelton and G. Ciardo, "Tutorial on structured continuous-time markov processes." Journal of Artificial Intelligence Research, vol. 51, pp. 725-778, 2014.
J. G. Fiscus, N. Radde, J. S. Garofolo, A. Le, J. Ajot, and C. Laprun, "The rich transcription 2005 spring meeting recognition evaluation," in Machine Learning for Multimodal Interaction. Springer, 2005, pp. 369-389.
E. Zwyssig, S. Renals, and M. Lincoln, "Determining the number of speakers in a meeting using microphone array features," in Proc. IEEE International Conference on Acoustics, Speech and Signal Processing (ICASSP), Mar. 2012, pp. 4765-4768.

\* cited by examiner

| Setup id | Room size | Speaker 1 position | Speaker 2 position | Mic. 1 position | Mic. 2 position | Mic. 3 position |
|---|---|---|---|---|---|---|
| 1 | [4,4,2.5] | [1.5,2,1] | [2.5,2,1] | [2.25,2,0.5] | [2,2,0.5] | [1.75,2,0.5] |
| 2 | [4,4,2.5] | [0.5,2,1] | [2.5,2,1] | [2.25,2,0.5] | [2,2,0.5] | [1.75,2,0.5] |
| 3 | [4,4,2.5] | [1.5,2,1] | [3.5,2,1] | [2.25,2,0.5] | [2,2,0.5] | [1.75,2,0.5] |
| 4 | [4,4,2.5] | [0.5,2,1] | [3.5,2,1] | [2.25,2,0.5] | [2,2,0.5] | [1.75,2,0.5] |

*FIG. 10*

| Label | $T_{60}$ (s) | $C_{50}$ (dB) | DRR (dB) | Setup id |
|---|---|---|---|---|
| $R_1P_1$ | 0 | $\infty$ | $\infty$ | 1 |
| $R_1P_2$ | 0 | $\infty$ | $\infty$ | 2 |
| $R_1P_3$ | 0 | $\infty$ | $\infty$ | 3 |
| $R_1P_4$ | 0 | $\infty$ | $\infty$ | 4 |
| $R_2P_1$ | 0.2 | [21.29, 23.58] | [-2.40, 3.59] | 1 |
| $R_2P_2$ | 0.2 | [18.96, 24.11] | [-7.02, 0.81] | 2 |
| $R_2P_3$ | 0.2 | [18.92, 22.94] | [-7.04, -0.13] | 3 |
| $R_2P_4$ | 0.2 | [18.55, 20.45] | [-8.72, -2.28] | 4 |
| $R_3P_1$ | 0.4 | [8.47, 11.02] | [-6.71, -0.54] | 1 |
| $R_3P_2$ | 0.4 | [6.98, 10.51] | [-9.38, -0.36] | 2 |
| $R_3P_3$ | 0.4 | [7.62, 12.44] | [-9.32, -0.57] | 3 |
| $R_3P_4$ | 0.4 | [7.47, 8.80] | [-11.98, -7.26] | 4 |
| $R_4P_1$ | 0.6 | [4.89, 6.48] | [-9.01, -4.00] | 1 |
| $R_4P_2$ | 0.6 | [3.74, 6.24] | [-12.29, -2.67] | 2 |
| $R_4P_3$ | 0.6 | [3.67, 6.54] | [-13.21, -3.39] | 3 |
| $R_4P_4$ | 0.6 | [3.48, 4.58] | [-14.32, -8.39] | 4 |
| $R_5P_1$ | 0.8 | [2.24, 4.01] | [-11.20, -3.76] | 1 |
| $R_5P_2$ | 0.8 | [1.62, 4.07] | [-13.03, -6.71] | 2 |
| $R_5P_3$ | 0.8 | [1.65, 4.34] | [-12.40, -2.96] | 3 |
| $R_5P_4$ | 0.8 | [1.57, 1.97] | [-13.72, -9.93] | 4 |
| $R_6P_1$ | 1 | [0.93, 3.26] | [-12.37, -3.09] | 1 |
| $R_6P_2$ | 1 | [-0.13, 2.62] | [-15.13, -7.37] | 2 |
| $R_6P_3$ | 1 | [-0.18, 2.61] | [-15.79, -6.32] | 3 |
| $R_6P_4$ | 1 | [-0.02, 0.63] | [-16.44, -12.64] | 4 |

| Label | File name | Number of speakers | Number of microphones | Duration (minutes) |
|---|---|---|---|---|
| AMI1 | AMI_20041210-1052 | 4 | 8 | 12.2 |
| AMI2 | AMI_20050204-1206 | 4 | 8 | 11.9 |
| CMU1 | CMU_20050228-1615 | 4 | 3 | 12.0 |
| CMU2 | CMU_20050301-1415 | 4 | 3 | 12.0 |
| ICSI1 | ICSI_20010531-1030 | 7 | 6 | 12.2 |
| ICSI2 | ICSI_20011113-1100 | 9 | 6 | 12.0 |
| NIST1 | NIST_20050412-1303 | 10 | 7 | 12.1 |
| NIST2 | NIST_20050427-0939 | 4 | 7 | 11.9 |
| VT1 | VT_20050304-1300 | 5 | 2 | 12.0 |
| VT2 | VT_20050318-1430 | 5 | 2 | 12.1 |

*FIG. 12*

| Relative Reduction % | Missed Speech % | False Alarms (%) | Speaker Error (%) | DER (%) |
|---|---|---|---|---|
| | 0.66 | -19.9 | -69.5 | -58.1 |

FIG. 17

METHOD FOR MICROPHONE SELECTION
AND MULTI-TALKER SEGMENTATION
WITH AMBIENT AUTOMATED SPEECH
RECOGNITION (ASR)

FIELD

Aspects described herein relate generally to computers, computer systems, and automatic voice recognition. More particularly, aspects described herein are used to perform microphone selection and multi-talker segmentation to choose a suitable input stream for performing automatic speech recognition (ASR).

BACKGROUND

Speaker diarization systems are increasingly important for helping to overcome key challenges faced by automatic meeting transcription systems. These systems aim to segment an audio signal into homogeneous sections with one active audio source and answer the question "who spoke when?" Speaker diarization provides important information in multiple applications such as speaker indexing and rich transcription of multi-speaker audio streams. The audio streams may be generated in multiple scenarios such as call centers, broadcast news, or meetings. Often the positions of either the audio source and/or the microphones may be unknown. Additionally, recordings may be distorted by noise, reverberation or non-speech acoustic events (e.g., music) degrading the diarization performance (see "Speaker diarization: a review of recent research" by X. Anguera).

Current algorithms can only utilize spatial information when multi-microphone recordings are available. This information is usually related to a Time Delay of Arrival (TDOA) that represents the time delay of the same signal in two different microphones. In a single-microphone scenario this feature is infeasible to compute and common speech features such as Mel-Frequency Cepstral Coefficients (MFCC) and/or Perceptual Linear Predictive (PLP) may be used to diarize. Furthermore, these current algorithms use multi-microphone information from arrayed systems where the relative location of each microphone to a point of reference is known.

Although TDOA has previously been utilized in a number of different fields, this parameter is not used for microphone selection due to excessive noise that may be created by ambient noise, reverberation, and/or head movements of a human speaker. Furthermore, microphones located a long distance from an audio source often yield unreliable TDOA estimates.

SUMMARY

The following summary is for illustrative purposes only, and is not intended to limit or constrain the detailed description. The following summary merely presents various described aspects in a simplified form as a prelude to the more detailed description provided below.

According to one or more illustrative aspects, spatial information may be used to select perceived best microphone signals available, and may subsequently be used to perform speaker segmentation. For example, a plurality of audio signals may be received at a plurality of microphones. A time delay of arrival (TDOA) may be determined between these audio signals at regular intervals, and based on the TDOA, audio signals may be associated with one of an audio source or interference. As a result, the TDOAs may be clustered together based on their affiliation with either a sound source or interference. TDOAs may be clustered for different possible microphone pairs, and confidence measures may be determined for these different possible microphone pairs. Based on the confidence measures, a best microphone pair may be selected. Furthermore, based on the clustering, audio sources may be identified for each audio signal, and the audio signals may be segmented.

The summary here is not an exhaustive listing of the novel features described herein, and is not intended to be limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and is not limited by, the accompanying figures in which like numerals indicate similar elements.

FIG. 10 depicts a table indicating the setup configurations according to one or more illustrative aspects described herein.

FIG. 11 depicts a table assigning a label to each evaluation condition according to one or more illustrative aspects described herein.

FIG. 12 depicts the details of the recordings used in this evaluation according to one or more illustrative aspects described herein.

FIG. 17 depicts overall diarization results according to one or more illustrative aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural or functional modifications may be made, without departing from the scope of the present disclosure.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
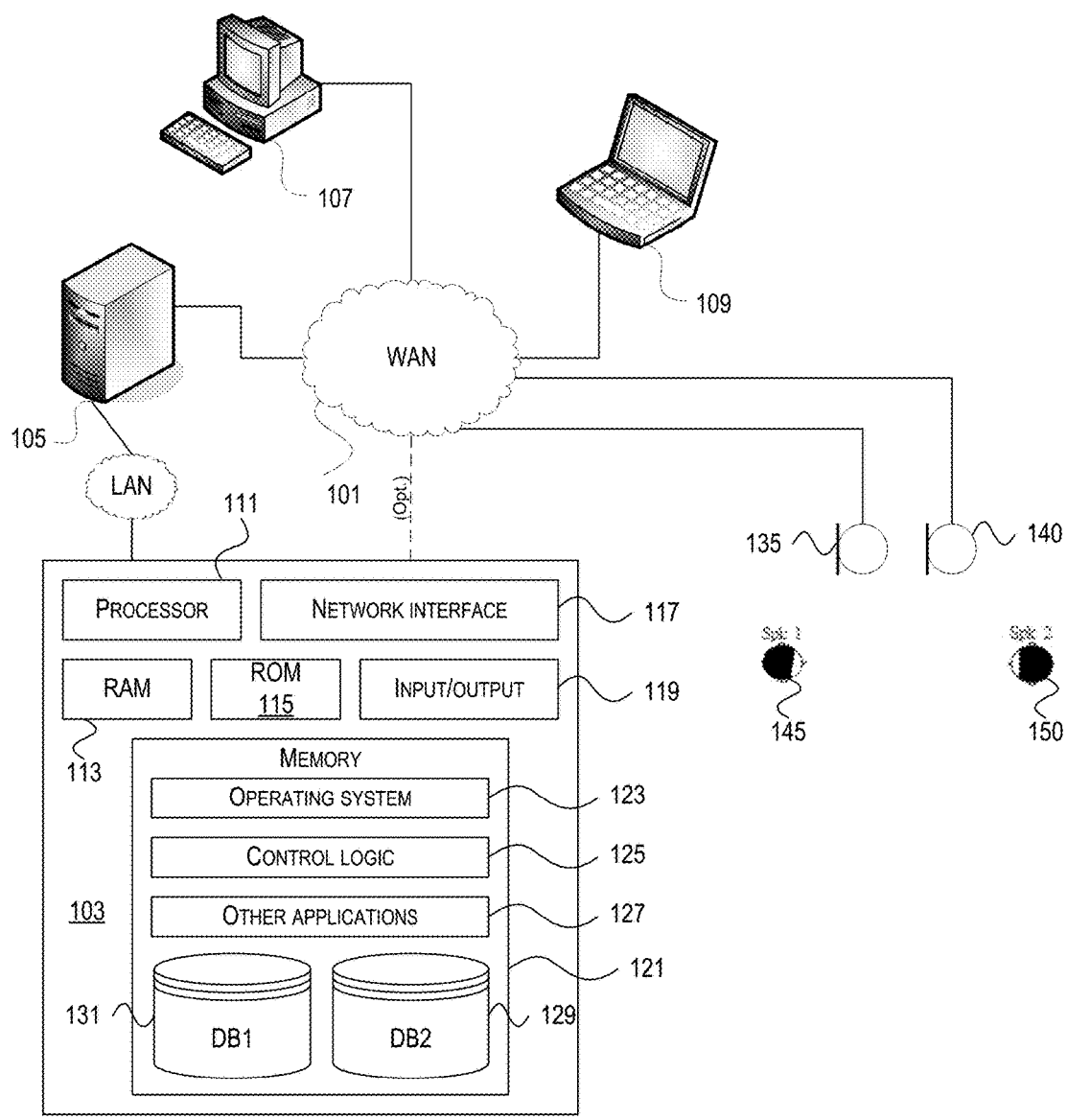
FIG. 1 depicts one example of a network architecture and data processing device that may be used to implement one or more illustrative aspects described herein.

FIG. 1 depicts one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, local area networks (LAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

Devices 103, 105, 107, 109 may be automatic conversational systems having multiple computer-implemented dialogue components for conducting an automated dialogue process with a user. Devices 103, 105, 107, 109 may allow for a human-machine dialogue arrangement. According to some aspects, Devices 103, 105, 107, 109 may include multiple computer-implemented dialogue components, which may be configured to intercommunicate and use context to narrow down understanding, recognition, and/or reasoning errors. In some embodiments, Devices 103, 105, 107, 109 may detect and/or resolve anaphora based on linguistic cues, dialogue context, and/or general knowledge.

The term "network" as used herein and depicted in the drawings might refer not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, microphones 135, 140, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Audio sources 145, 150 may provide input to the data server 103 through microphones 135, 140, e.g., recording speech. Audio sources 145, 150 may be, e.g., individuals participating in and speaking during a meeting. The positions of both microphones 135, 140 and audio sources 145, 150 may be unknown. In one example, the microphones 135, 140 may comprise microphones on a smartphone. In another example, microphones 135, 140 may be installed in a room. Users also may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with other aspects described herein. The control logic may also be referred to herein as the data server software 125. Functionality of the data server software may be operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Disclosed embodiments may be implemented via an application on, for example, devices 103, 105, 107, 109, 135, 140. For example, the application may be a speech-based personal assistant application such as SIRI, NINA, Dragon Mobile Assistant, etc. Examples of applications in which such a personal assistant application may be implemented may include telephone based applications, mobile device applications, text-messaging based applications (e.g., SMS, TMS), email applications, web browsers, word processing applications, and/or any text-based or speech-based application.

Figure 2:
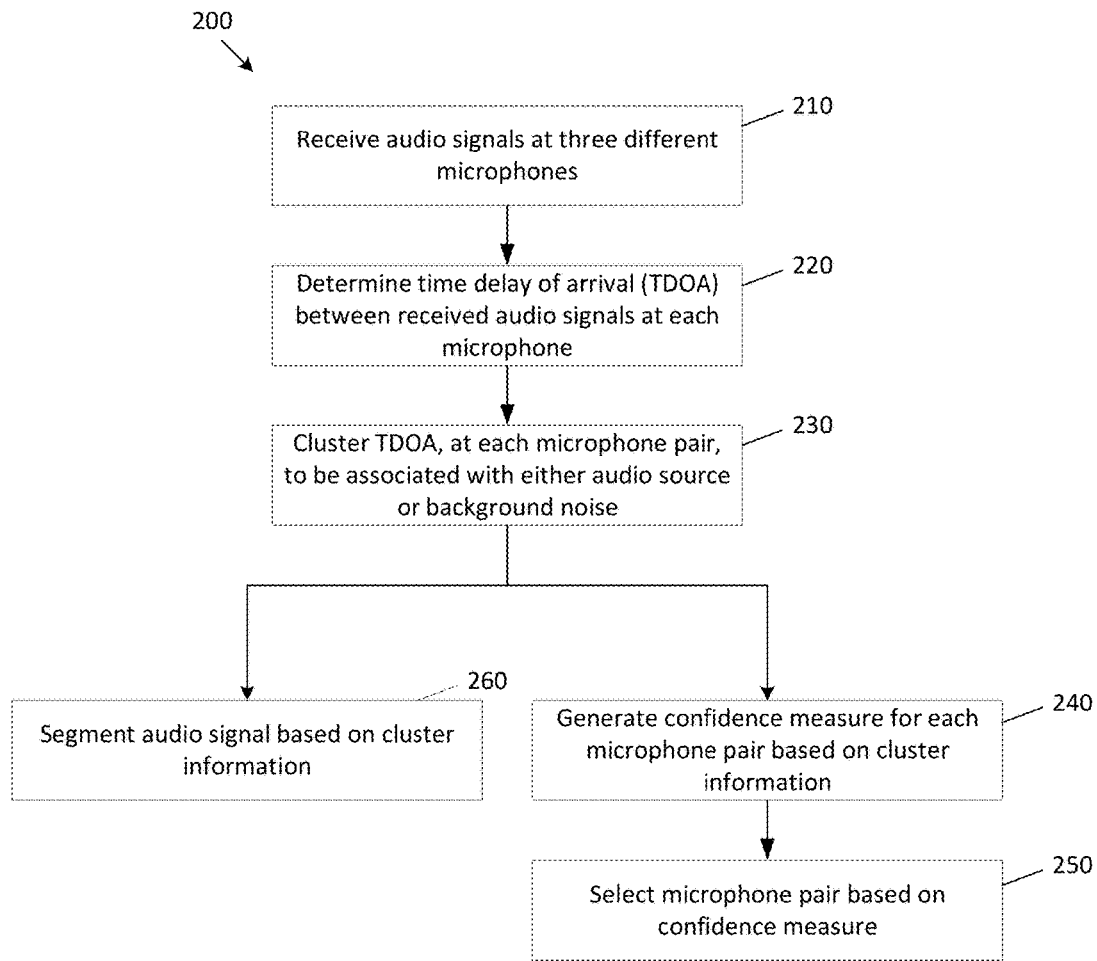
FIG. 2 depicts one example method for selecting microphone pairs and segmenting audio signals that may be used to implement one or more illustrative aspects described herein.

FIG. 2 depicts one example method 200 for selecting microphone pairs and segmenting audio signals that may be used to implement one or more illustrative aspects described herein.

At step 210, a plurality of microphones, such as microphones 135, 140 may receive a plurality of audio signals. For example, two individuals, such as audio sources 145, 150 may be speaking in a room and the room may have three microphones positioned throughout. The microphones may be at fixed or ad hoc locations. For example, in a doctor's office, two microphones may be installed near an examination area and one microphone may be installed near the doctor's desk. In another example, the microphones may comprise smartphone microphones. In this example, the audio sources 145, 150 may bring their smartphones to a meeting and record the meeting. The microphones may comprise multiple microphones from a single smartphone or may comprise combination of microphones from different devices. Alternatively, the microphones may comprise a mixture of both microphones at fixed locations and microphones at ad hoc locations. This concept is discussed further below with regards to FIG. 4 & FIG. 9.

At step 220, a TDOA between the audio signals received at the microphones may be determined. A TDOA may be determined between different microphone pairs. For example, if three microphones are used to harvest the audio signals, the method 200 may compute three TDOA. This concept is discussed further below with regards to FIG. 4.

At step 230, the TDOAs, from the different microphone pairs, may be clustered. For example, the TDOA may be associated with an audio source, or alternatively the TDOA may be associated with background noise. TDOAs associated with an audio source may be clustered together, and TDOAs associated with background noise may also be clustered together. The clustering may be performed using statistical models such as the Gaussian Mixture Model (GMM). The GMM may be learned in an unsupervised manner from TDOA estimates. The GMM may also be trained by an Expectation-Maximization (EM) method. The EM method may include linear constraints on the means and variances of the GMM. The linear constraints on the mean may be applied as to ensure that the GMMs associated with speech are centered on the maximum of the TDOA density function. The linear constraints on the variance may be applied to ensure that the GMM associated with background noise has variance larger than the variance of any GMM associated with speech. Linear constraints on variance may also ensure that GMMs associated with speaker mixtures have the same variance. This computation using the GMM and EM method are described further below with regards to "Multi-channel diarization based on robust TDOA modeling" and FIGS. 5-8.

At step 240, a confidence measure may be generated for the different microphone pairs based on the clustering. For example, the confidence measure may be computed as the a posteriori probability of a speaker mixture in the different GMMs (one GMM may be generated per pair of microphones). Computation of the confidence measure is further described below with regards to "Confidence measure" and equation 1.39.

At step 250, a microphone pair may be selected based on the confidence measure. For example, the pair with the lowest uncertainty may be selected. This may comprise a microphone pair that yields the lowest Diarization Error Rate (DER) in the model. This method is described further below with regards to "Alignment" and "Channel selection."

At step 260, the audio signal may be segmented based on clustering information. For example, the posteriors are maximized per time frame to extract the talker segmentation information. In this example, a speaker index is related to the mixture that provides the highest posterior in a given frame. This method is described further below with regards to the "Improved system."

Figure 3:
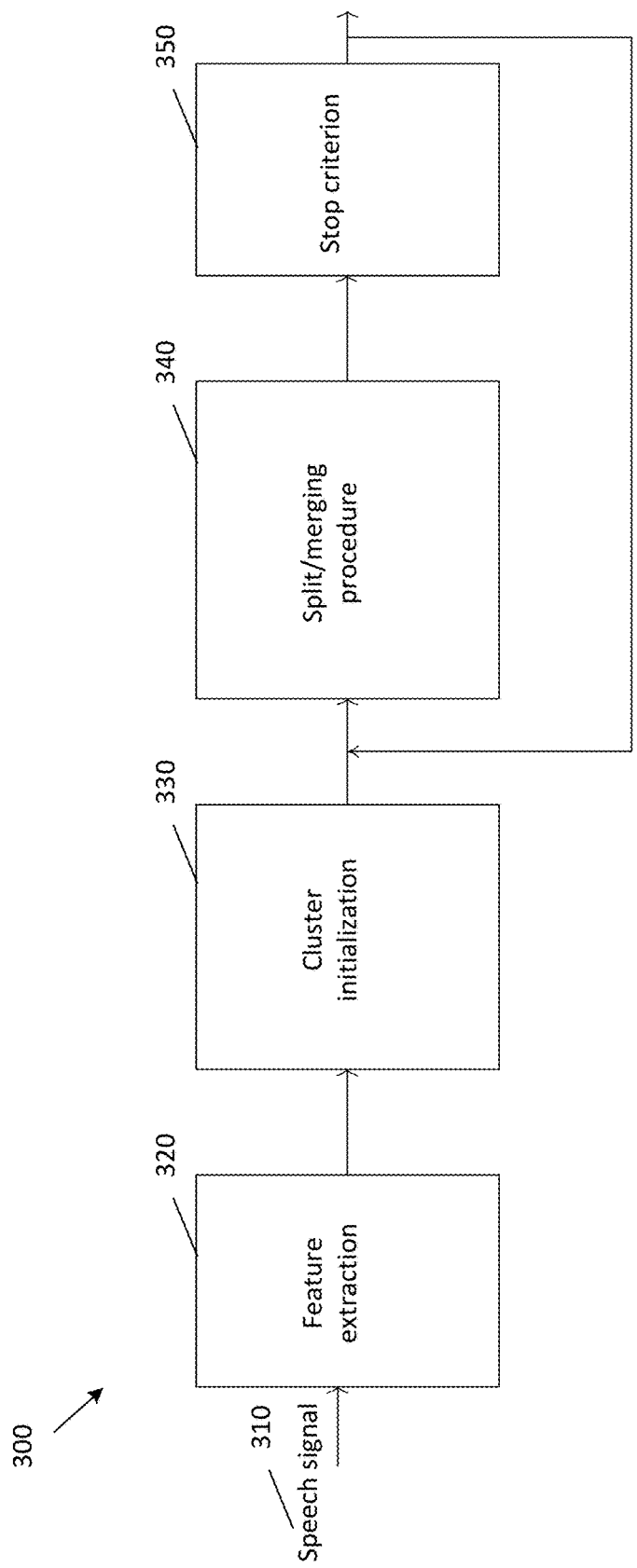
FIG. 3 depicts a generalized diarization block diagram, representing the general architecture of a known diarization system that may be used to implement one or more illustrative aspects described herein.

FIG. 3 depicts a generalized diarization block diagram, representing the general architecture of a known diarization system 300 that may be used to implement one or more illustrative aspects described herein. Known diarization approaches (see "Speaker diarization: a review of recent research" by X. Anguera) fall into two main categories: bottom-up and top-down. The former may be initialized for an entire audio input with many clusters (typically more than the expected number of audio sources) which may be merged successively until only one audio source per cluster remains. The latter may start with one cluster and add new clusters until all audio sources are correctly modelled. Feature extraction 320 of speech signal 310, cluster initialization 330, split/merging procedure 340 and/or stop criterion 350 are important issues in these systems for which different solutions have been proposed in literature including "Speaker diarization: a review of recent research," by X. Anguera Miro, and "A review of recent advances in speaker diarization with bayesian methods," by T. Stafylakis.

Known diarization methods may be broken down into two main groups: single-channel and multi-channel approaches.

Single-channel speaker diarization algorithms discriminate between different audio sources using speech dependent features such as MFCC and/or PLP coefficients that may be commonly extracted from data captured by a close talking microphone. This is described in "The Cambridge University March 2005 speaker diarisation system" by R. Sinha and "An overview of automatic speaker diarization systems" by S. Tranter. Log Mel-filterbanks are also employed in Deep Neural Network (DNN)-based systems (see "The 2015 sheffield system for longitudinal diarisation of broadcast media" by R. Milner) or i-vector features widely used in speaker recognition (see "Speaker diarization with plda i-vector scoring and unsupervised calibration" by G. Sell.

When multi-channel signals are available, the use of TDOA estimates may be used to perform diarization. In "An information theoretic combination of MFCC and TDOA features for speaker diarization" by D. Vijayasenan, a framework to combine these TDOAs with MFCCs is proposed. "Speaker diarization using unsupervised discriminant analysis of inter-channel delay features," by N. Evans, describes that the diarization may be performed using the TDOAs obtained from all combinations of microphones. An unsupervised discriminant analysis method, such as a Linear Discriminant Analysis (LDA)-like formulation, may then be applied to these TDOAs to transform the input space into a new feature space. These new features may be used to diarize using an agglomerative clustering approach. The diarization system in T. Oku's "Low-latency speaker diarization based on bayesian information criterion with multiple phoneme classes" is based on estimates of the phoneme, vowel and consonant classes, which may be extracted from a phoneme recognizer. Speaker change points and speaker clusters may be calculated using the Bayesian Information Criterion (BIC) (see "Estimating the dimension of a model" by G. Schwarz). This criterion may be computed from Gaussian models fitted to MFCC features computed from two successive speech segments. In one example, the criterion may be calculated by using different models for different segments and for different phoneme classes. A real-time meeting analyzer is presented in "Low-latency real-time meeting recognition and understanding using distant microphones and omni-directional camera" by T. Hori. Several blocks of the full system are presented (e.g. dereverberation, source separation, speech recognition) along with speaker diarization which may be based on clustering the Direction of arrival (DOA). Speaker diarization decisions may be extracted by averaging the per-frame diarization decisions over the word length. A front-end for speaker diarization based on beamforming is presented in X. Anguera's "Acoustic beamforming for speaker diarization of meetings." The beamforming uses TDOAs which may be computed from Generalized Cross Correlation with Phase Transform (GCC-PHAT) (see "The generalized correlation method for estimation of time delay" by C. H. Knapp), and may be post-processed by dual pass viterbi decoding. The first pass may select the most probable paths from N-best lists of TDOAs (which may be computed from a pair of microphones) and the second pass may find the best path given combinations of paths between different pairs of microphones computed in the first pass.

While speech features are commonly used in the diarization systems, visual cues may also be included into the system to improve the final diarization performance (see "Audiovisual diarization of people in video content" by E. El Khoury).

Multi-channel diarization based on robust TDOA modelling.

Figure 4:
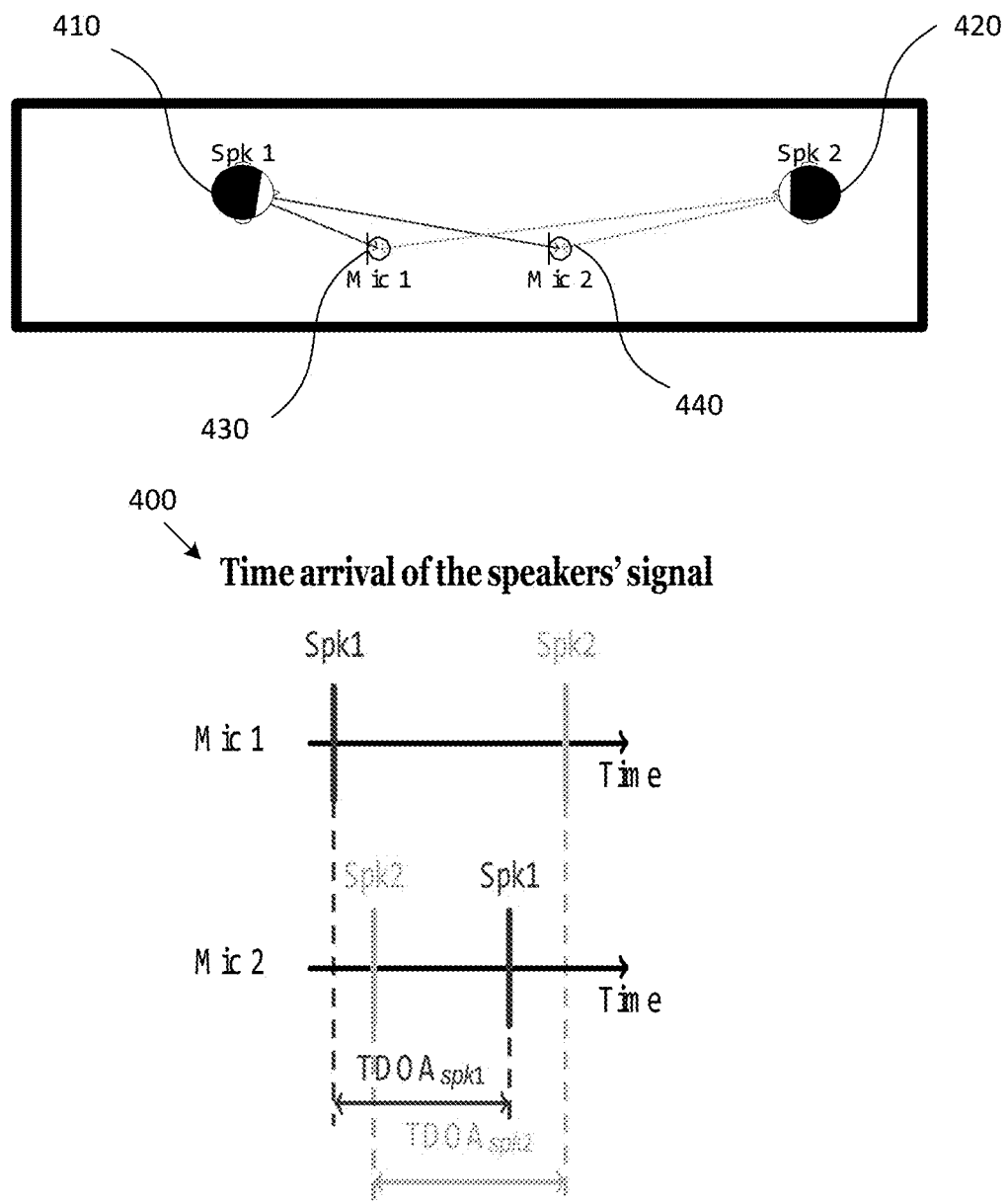
FIG. 4 depicts the TDOA concept that may be used to implement one or more illustrative aspects described herein.

FIG. 4 depicts the TDOA concept that may be used to implement one or more illustrative aspects described herein. Assuming microphone 1 430 is used as a reference, TDOA$_{spk1}$ may be positive. TDOA$_{spk2}$ may be similar to TDOA$_{spk1}$ in magnitude, and may be negative.

In a multi-channel diarization system the received signal $y_p(n)$ at the pth microphone at time index n may be given by equations 1.1 and 1.2:

$$x_{i,p}(n) = \sum_{m=0}^{M-1} h_{i,p}(m)s_i(n-m), \quad (1.1)$$

$$y_p(n) = \sum_{i=1}^{N_{spk}} x_{i,p}(n) + v_p(n) \quad (1.2)$$

In this calculation, $x_{i,p}(n)$ may comprise the contribution of the ith audio source at the pth microphone, $h_{i,p}(m)$ may comprise the room impulse response between the ith audio source and the pth microphone, and $v_p(n)$ may comprise the additive noise present at pth microphone.

The TDOA is a common feature extracted in multi-microphone environments. This parameter may represent the difference of arrival times when the same signal is recorded by two different microphones. FIG. 4 illustrates the TDOA obtained from two microphones 430, 440 and two different audio sources 410, 420. In one example, selecting the microphone 1 430 as the reference signal, the TDOA of audio source 410 (TDOA$_{spk1}$) is positive. Since audio source 420 is closer to microphone 2 440 and therefore the signal arrives first to this microphone and then to the microphone 1 430, the TDOA of audio source 420 (TDOA$_{spk2}$) is negative, as shown in exemplary process 400. Thus, the TDOA may be associated with a certain audio source to perform diarization.

Baseline System.

The baseline system, referred to as the Optimal Geometry baseline (OG), may rely on the fact that one of the microphones, such as microphone 135, used to compute the TDOAs may be closer to one audio source 145, such as a first individual participating in a meeting, and the other microphone (e.g., microphone 140) may be closer to audio source 150, which may comprise a second participant in a meeting. Therefore, under this assumption, positive TDOAs may be obtained when one of the audio sources is talking and negative TDOAs may be obtained when the other audio source is talking. In most of the real scenarios, the position of the microphones may be unknown. For comparison purposes with the method in the improved system, described below, the input features of this baseline are the same TDOAs features used in our system.

Improved System.

Figure 5:
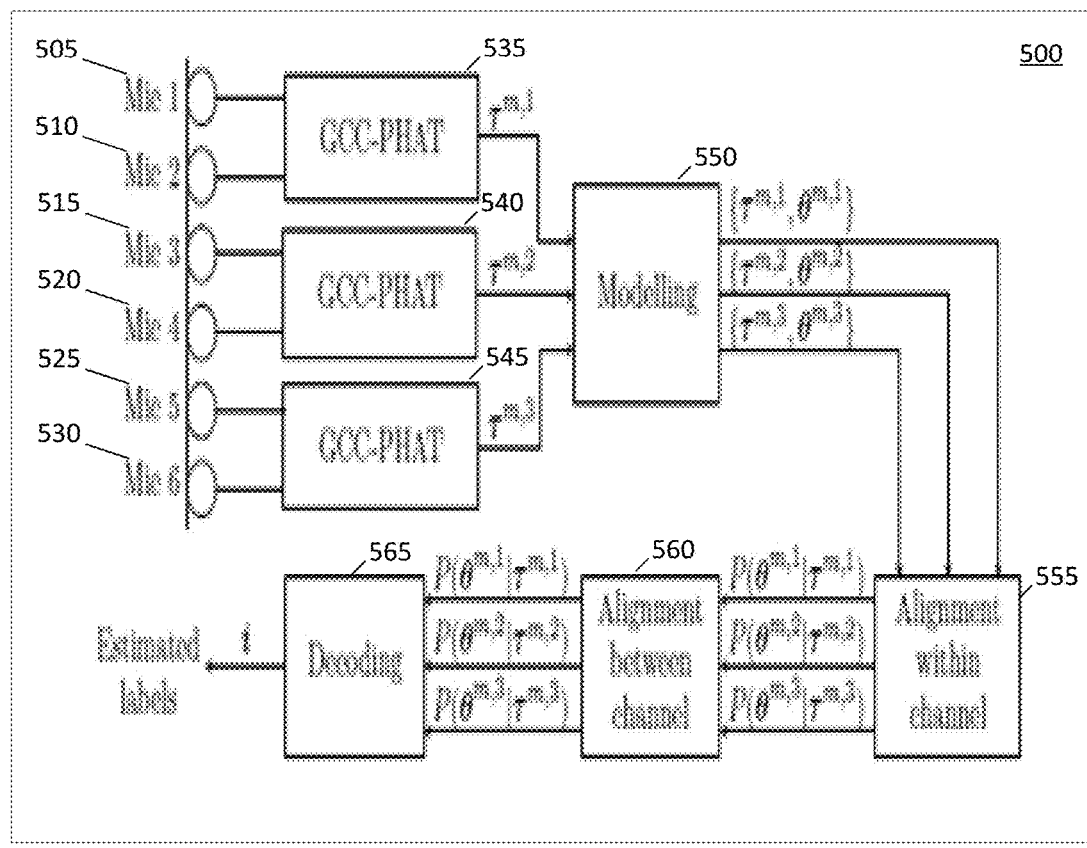
FIG. 5 depicts a block diagram of the method for three pairs of microphones according to one or more illustrative aspects described herein.

FIG. 5 depicts a block diagram of the method for three pairs of microphones according to one or more illustrative aspects described herein. In the improved system, the TDOAs may be modelled in a robust manner to more accurately perform speaker diarization. The TDOAs may be estimated using GCC-PHAT at blocks 535, 540, 545. GCC- PHAT may compute the normalized cross-correlation between two signals in the frequency-domain via equation 1.3:

$$G_{PHAT}(f) = \frac{X(f) \cdot Y(f)^*}{|X(f) \cdot Y(f)^*|} \quad (1.3)$$

where $X(f)$ and $Y(f)$ may comprise the Fourier transforms of two input signals. The TDOA $\tau_l$ for the frame l may be found by maximizing $R_{PHAT}(\tau)$, via equation 1.4, $$\tau_l = \underset{\tau}{\operatorname{argmax}} R_{PHAT}(\tau) \quad (1.4)$$

where $R_{PHAT}(\tau)$ may comprise the inverse Fourier transform of equation 1.3.

The frame size employed to compute Fourier transforms $X(f)$ and $Y(f)$ may be selected as a balance between robustness and time resolution of changes in TDOA. In one example, a frame size of 500 ms with an 87.5% overlap between consecutive frames may be used.

The total number of different TDOA streams J, referred to as channels in this section from this point onwards, that are possible to compute with an $N_{mic}$ microphone setup may be given by equation 1.5, $$J = \frac{N_{mic}!}{2 \cdot (N_{mic} - 2)!} \quad (1.5)$$

For example, the aim may be to find, for the different frames l, a speaker index i that maximizes the posterior probability of the speaker model $\theta_i$ given the TDOA sample $\tau_l$. This may be given by equations 1.6 and 1.7:

$$\underset{i}{\operatorname{argmax}} P(\theta_i | \tau_l), \quad (1.6)$$

$$P(\theta_i | \tau_l) = \frac{P(\tau_l | \theta_i) \cdot P(\theta_i)}{\sum_{n=1}^{N_{spk}} P(\tau_l | \theta_e) \cdot P(\theta_e)}. \quad (1.7)$$

The denominator of equation 1.7 may be independent of i and as a result it may be dropped from the maximization. Thus the final maximization expression may comprise equation 1.8:

$$\underset{i}{\operatorname{argmax}} P(\tau_l | \theta_i) \cdot P(\theta_i). \quad (1.8)$$

FIG. 5 shows a block diagram of the method 500 for a setup with three pairs of microphones comprising a first microphone pair (microphones 505, 510), a second microphone pair (microphones 515, 520), and a third microphone pair (microphones 525, 530). The modelling block 550 in FIG. 5 is described further below with regards to "Computation of the speaker model" and "Local modeling." Alignment within channel 555, and alignment between channels 560 are described with regards to "Alignment." The decoding block 565 is described below with regards to "Channel selection," "Combination of channels," and "Hidden Markov Model (HMM)."

Computation of the Speaker Model.

A Gaussian Mixture Model (GMM) may be represented by $\theta = (\lambda, \mu, \sigma)$ and may be parametrized by the a priori vector ($\lambda$), the mean vector ($\mu$) and the covariance matrix ($\sigma$). The parameters of the individual mixtures may be represented by $\theta_i = (\lambda_i, \mu_i, \sigma_i)$.

A total of $N_{spk}+1$ mixtures may be considered in this approach, e.g., $\theta = (\theta_B, \theta_1, \theta_2, \ldots, \theta_{N_{spk}})$, $N_{spk}$ mixtures to model the audio sources' TDOAs and an additional mixture to model the noisy estimates via equation set 1.9:

Background noise model: $\theta_B = (\lambda_N, \mu_N, \sigma_N)$.

Speaker 1 model: $\theta_1 = (\lambda_1, \mu_1, \sigma_1)$.

Speaker 2 model: $\theta_2 = (\lambda_2, \mu_2, \sigma_2)$.

...

Speaker $N_{spk}$ model: $\theta_{N_{spk}} = (\lambda_{N_{spk}}, \mu_{N_{spk}}, \sigma_{N_{spk}})$. (1.9)

The Maximum Likelihood Estimate (MLE) (see "The EM algorithm and extensions" by G. McLachlan) of the model parameters given the data (e.g., TDOAs) may be used to obtain $\theta$ via equation 1.10:

$$\underset{\theta}{\operatorname{argmax}} \log \mathcal{L}(\theta | \tau), \text{ where} \quad (1.10)$$

$$\tau = (\tau_1, \ldots, \tau_{N_{T\,DOA}}).$$

In common applications, $\tau$ may be inaccurate due to spurious noise, overlapping audio sources, non-speech acoustic events, and/or reverberation. In this example, $\theta$ may be robust to these outliers.

In order to estimate these model parameters $\theta$ in a robust manner, linear constraints may be applied on the mean and the standard deviation in the Expectation-Maximization (EM) algorithm.

Linear Constraints on the Mean.

The linear constraints on the mean may be determined a priori by the matrix $\mathcal{M}$ and the vector $\mathbf{C}$. These are defined such that the mean of the noise model $\mu_B$ may be independent of the speakers' means. The speakers' means may be separated by a constant to avoid audio sources' means being extremely close to each other, e.g., $\mu_1 \approx \mu_2$. Therefore, the linear constraints on the means may be given by equation 1.11:

$$\mu = M\beta + C, \quad (1.11)$$

which may be written as equations 1.12 and 1.13:

$$\begin{bmatrix} \mu_B \\ \mu_1 \\ \mu_2 \\ \vdots \\ \mu_{N_{spk}} \end{bmatrix} = \begin{bmatrix} 1 & 0 \\ 0 & 1 \\ 0 & 1 \\ \vdots & \vdots \\ 0 & 1 \end{bmatrix} \cdot \begin{bmatrix} \beta_1 \\ \beta_2 \end{bmatrix} + \begin{bmatrix} 0 \\ 0 \\ C_2 \\ \vdots \\ C_{N_{spk}} \end{bmatrix}, \quad (1.12)$$

$$\mu_B = \beta_1, \quad (1.13)$$
$$\mu_1 = \beta_2,$$
$$\mu_2 = \beta_2 + C_2,$$
$$\ldots$$
$$\mu_{N_{spk}} = \beta_{N_{spk}} + C_{N_{spk}}.$$

The term $C_{N_{spk}}$ may be computed, via equation 1.14, as the difference between the highest peak $\tau_{max1}$ (which may be given by equation 1.15) and the $N_{spk}$-th highest peak $\tau_{maxN_{spk}}$ (which may be given by equation 1.16) of the density estimation $p(\tau)$. The density estimation $p(\tau)$ may be computed from $\tau$, and via equation 1.17, using a Gaussian kernel $$\mathfrak{K}\left(\frac{\|T - T_1\|}{\sigma}\right),$$

$$C_{N_{spk}} = \tau_{maxN_{spk}} - \tau_{max1}, \quad (1.14)$$

$$\tau_{max1} = \arg\max_{\tau}\left\{p(\tau)\left|\frac{dp(\tau)}{d\tau} = 0\right.\right\}, \quad (1.15)$$

$$\tau_{maxN_{spk}} = \arg\max_{\tau}\left\{p(\tau)\left|\frac{dp(\tau)}{d\tau} = 0 \text{ and}\right.\right. \quad (1.16)$$

$$\tau \neq \{\tau_{max1}, \tau_{max2}, \dots, \tau_{max(N_{spk}-1)}\}\},$$

$$p(\tau) = \quad (1.17)$$

$$\frac{1}{N_{TDOA}} \sum_{l=1}^{N_{TDOA}} \frac{1}{\sigma}\mathfrak{K}\left(\frac{\|\tau - \tau_l\|}{\sigma}\right) = \frac{1}{N_{TDOA}} \sum_{l=1}^{N_{TDOA}} \frac{1}{(2\pi\sigma^2)^{1/2}} e^{-\frac{\|\tau-\tau_l\|^2}{2\sigma^2}},$$

where $\sigma$ may comprise the standard deviation of the Gaussian kernel. This value may be computed, via equation 1.18, using Silverman's rule of thumb (see "Density estimation for statistics and data analysis" by B. W. Silverman), $$\sigma^* = 0.9 N^{-1/5} \cdot \min(\sigma, IQR/1.34), \quad (1.18)$$

where $\sigma$ and Interquartile range (IQR) may comprise the standard deviation and the interquartile range computed from the input data $\tau$ respectively. In order to provide robustness to the estimation of $p(\tau)$, positive and negative extreme values may be removed from $\tau$. The remainder unknown elements in C may be computed following the same procedure. In this example, $N_{spk}$ may be replaced by the speaker model ID number.

Density kernels may be used to estimate the probability density because they are independent from the bin width (see "Pattern Recognition and Machine Learning (Information Science and Statistics)" by C. M. Bishop) and thus the peaks may be accurately estimated.

The other unknown term in equation 1.11, $\beta$, may be determined by maximizing the likelihood of the model parameters given the TDOAs. This maximization problem may be solved using Expectation-Conditional Maximization (ECM) (see "ECM and MM algorithms for normal mixtures with constrained parameters" by D. Chauveau).

Linear Constraints on the Standard Deviation.

The linear constraints on the standard deviation may be fixed a priori by the vector G. This vector may be defined such that the deviation of the noise model may be wider than the deviations of the speakers' model since there might be outliers with extreme TDOA values. Head movements of both audio sources may be similar, and therefore the standard deviation of the speakers' models may be the same. Hence, the linear constraints on the standard deviation may be given by equations 1.19, 1.20, and 1.21:

$$\iota = \mathcal{G}\Upsilon, \quad (1.19)$$

$$\begin{bmatrix} 1/\sigma_B \\ 1/\sigma_1 \\ 1/\sigma_2 \\ \vdots \\ 1/\sigma_{N_{spk}} \end{bmatrix} = \begin{bmatrix} \iota_B \\ \iota_1 \\ \iota_2 \\ \vdots \\ \iota_{N_{spk}} \end{bmatrix} = \begin{bmatrix} 1 & 0 \\ 1 & 1 \\ 1 & 1 \\ \vdots & \vdots \\ 1 & 1 \end{bmatrix} \cdot \begin{bmatrix} \Upsilon_1 \\ \Upsilon_2 \end{bmatrix}, \quad (1.20)$$

$$\sigma_B = 1/\Upsilon_1, \quad (1.21)$$
$$\{\sigma_1, \sigma_2, \dots, \sigma_{N_{spk}}\} = 1/\Upsilon_1 + 1/\Upsilon_2,$$

since all elements of $\Upsilon$ are non-negative, $\sigma_B \geq \sigma_1, \sigma_2, \dots, \sigma_{N_{spk}}$.

In this case, the term $\Upsilon$ may be estimated by maximizing the likelihood of the parameters given the input data. This maximization problem may be solved by employing the Minorization-Maximization algorithm (see "ECM and MM algorithms for normal mixtures with constrained parameters" by D. Chauveau).

Additionally, variance flooring and variance ceiling may be applied to clamp on the lower and upper bounds, thus avoiding unlikely values.

Local Modeling.

In order to deal with the same audio source talking in different positions, such as a participant in a meeting walking around the room, the parameters of $\theta$ for small time analysis windows of length $N_w \ll N_{TDOA}$, where the audio source is static, may be determined. In this example, the audio source may not change positions in this time analysis window, and thus the modelling, which may have previously been given by equation 1.10, may be given by equation 1.22:

$$\arg\max_{\theta^v} \log \mathcal{L}(\theta^v | \tau^v), \quad (1.22)$$

where:

$$v = \left\{1, 2, \dots, \left\lceil \frac{N_{TDOA} - (N_w - N_o)}{N_o} \right\rceil\right\},$$

$$\tau^v = \{\tau_{(v-1)\cdot(N_w)+1}, \tau_{(v-1)\cdot(N_w)+2}, \dots, \tau_{(v-1)\cdot(N_w)+N_w}\}$$

and where $N_o$ may comprise the number of overlapped frames and $v$ may represent the analysis window.

The posterior of the overlapped TDOAs may be recomputed as the average of the overlapped posteriors between both analysis windows.

Alignment.

Figure 6:
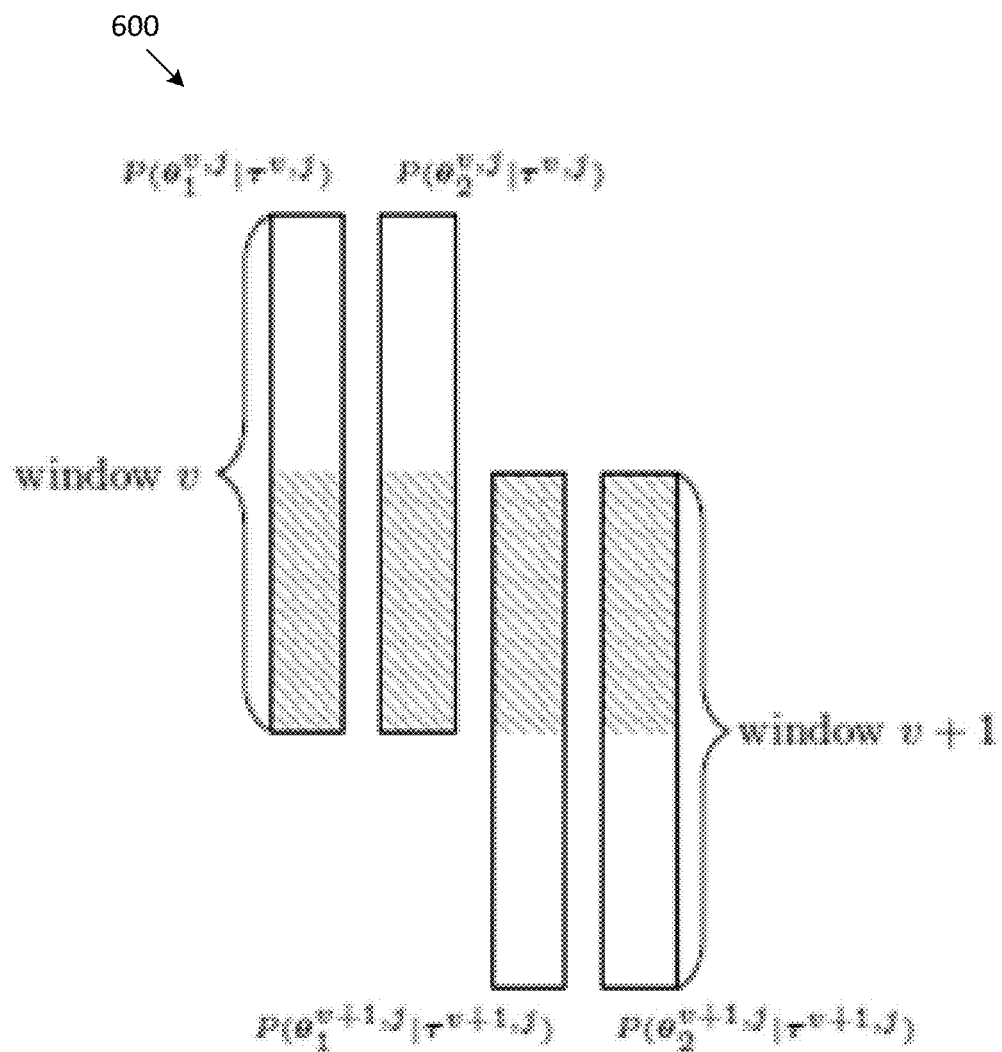
FIG. 6 depicts a representation of alignment within channel for the pair of microphones according to one or more illustrative aspects described herein.

FIG. 6 depicts a representation 600 of alignment within channel for the pair of microphones according to one or more illustrative aspects described herein. Two different alignments may be utilized to ensure that speaker indexes represent the same talker between two consecutive analysis windows (alignment within channel 555) and between the channels in the same window (alignment between channels 560).

Alignment within Channel.

The alignment within channel 555 aims at finding, for a given channel, the correspondence of the audio sources between two consecutive analysis windows. The solution adopted may be based on overlapping consecutive windows as it is shown in FIG. 6.

For simplicity, the TDOAs that are common in two consecutive frames, e.g., overlapped TDOAs, are denoted as $\tau_o$. $N_o$ represents the number of overlapped frames. The alignment within channel may seek the decision vector d such that equations 1.23, 1.24, 1.25, 1.26, and 1.27 are satisfied:

$$\arg\max_{d} \sum_{o=1}^{N_o} f(d_1(o), d(o)), \quad (1.23)$$

$$d_1 = \arg\max_{i} P(\theta_i^{v,j} \mid \tau_o), \quad (1.24)$$

$$d_2 = \arg\max_{i} P(\theta_i^{v+1,j} \mid \tau_o), \quad (1.25)$$

$$\tilde{d}_2 = d_2 (\bmod 2) + 1, \quad (1.26)$$

$$f(x, y) = \begin{cases} 1 & \text{if } x = y \\ 0 & \text{if } x \neq y \end{cases}, \quad (1.27)$$

where $d = \{d_2, \widetilde{d_2}\}$, $d_1 = \{d_1(1), d_1(2), \ldots, d_1(N_o)\}$ and $d_2 = \{d_2(1), d_2(2), \ldots, d_2(N_o)\}$ may represent the estimated speaker indexes in the overlap frames between the v and v+1 windows respectively for channel j. If $d = \widetilde{d_2}$, then P $(\theta_1^{v+1,j} \mid \tau^{v+1,j})$ and P $(\theta_2^{v+1,j} \mid \tau^{v+1,j})$ may be swapped. For example, this is applicable for $N_{spk}=2$. In another example, it may be extended to any value of $N_{spk}$ by creating d such that it contains $N_{spk}!$ vectors with additional decision permutations.

Alignment Between Channels.

Figure 7:
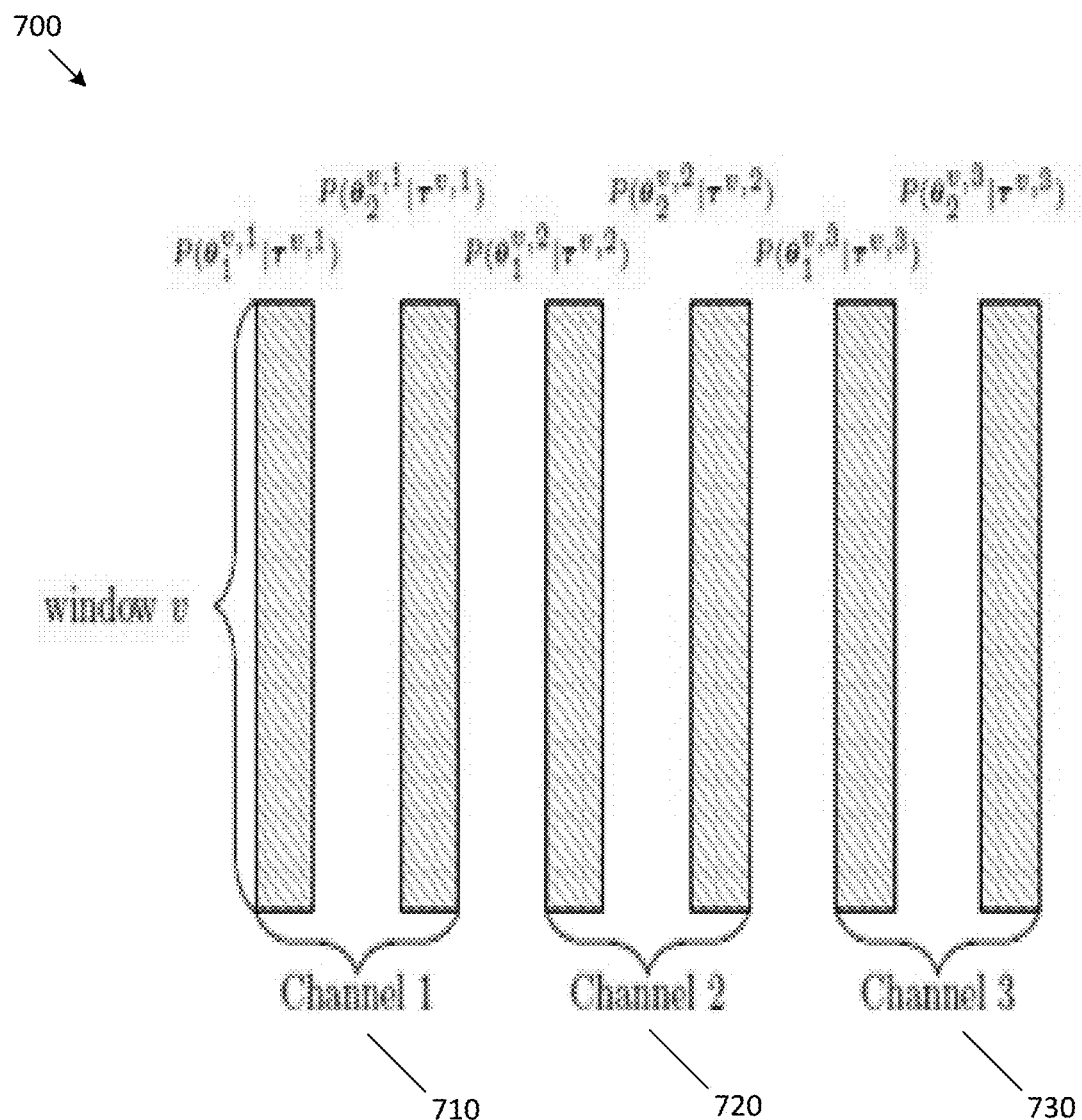
FIG. 7 depicts a representation of alignment between channels according to one or more illustrative aspects described herein.

FIG. 7 depicts a representation 700 of alignment between channels 560 according to one or more illustrative aspects described herein. FIG. 7 illustrates alignment between channels 710, 720, 730. The alignment between channels 560 may verify whether $\theta_1^{v,1}$ represents the TDOAs of the audio source that is modelled with $\theta_1^{v,j}$ or the audio source that is modelled with $\theta_2^{v,j}$ for $j=\{2, \ldots, J\}$. In one example, this verification may be carried out for $N_{spk}=2$ by finding d such that equations 1.28, 1.29, 1.30, 1.31, and 1.32 are satisfied:

$$\arg\max_{d} \sum_{n=1}^{M} s(d_1(n), d(n)), \quad (1.28)$$

$$d_1 = \arg\max_{i} P(\theta_i^{v,1} \mid \tau^{v,1}), \quad (1.29)$$

$$d_j = \arg\max_{i} P(\theta_i^{v,j} \mid \tau^{v,j}), \quad (1.30)$$

$$\tilde{d}_j = d_j (\bmod 2) + 1, \quad (1.31)$$

$$s(x, y) = \begin{cases} 1 & \text{if } x = y \\ 0 & \text{if } x \neq y \end{cases}, \quad (1.32)$$

where $d = \{d_j, \tilde{d}_j\}$. If $d = \tilde{d}_j$, then P $(\theta_1^{v,j} \mid \tau^{v,j})$ and P $(\theta_2^{v,j} \mid \tau^{v,j})$ may be swapped. FIG. 7 displays the notation for $J=3$. In another example, this approach may be applied to any $N_{spk}>2$ by forming d such that it comprises $N_{spk}!$ vectors with additional decision permutations.

Previous alignments may have a complexity of $O(N_{spk}!)$. Thus, in these examples, the execution time may rapidly increase when there are more than three audio sources. In order to reduce this complexity, a stochastic search may be performed using Genetic Algorithm (GA) (see "GA: A package for genetic algorithms in R" by L. Scrucca).

Channel Selection.

In the local modelling process, which may be given by equation 1.22, J different models may be fitted to the data which may be extracted from J channels (e.g., J different pairs of microphones) and the optimal model may be used to diarize equation 1.6. A priori, the pair that is closer to the audio source may comprise the best pair. In this example, the positions of audio sources and microphones may be unknown and additionally, noise may degrade the TDOAs computed in those pairs of microphones that are close to the noise source.

The channel selection may aim to choose the best pair to diarize, e.g., the model that provides the lowest Diarization Error Rate (DER). In this example, the labels may be unknown and therefore the DER may not be directly minimized. In this example, the commonly applied metric in model selection (see "Model selection and multimodel inference: a practical information-theoretic approach" by K. P. Burnham), called Bayesian Information Criterion, may be given by equation 1.34, and may be used to find the optimal pair of microphones j via equations 1.33 and 1.34:

$$\{\theta^v, \tau^v\} = \arg\max_{j} BIC(\theta^{v,j}, \tau^{v,j}) \quad (1.33)$$

$$BIC(\theta, \tau) = -2 \log \mathcal{L}(\theta \mid \tau) + N_{fp} \cdot \log(N_{TDOA}) \quad (1.34)$$

where $\mathcal{L}(\theta \mid \tau)$: likelihood of the model $\theta$ given the data $\tau$, e.g., P $(\tau \mid \theta)$, $N_{fp}$: the number of free parameters to be estimated, and $N_{TDOA}$: total number of TDOA samples.

The equation 1.33 may select the model that maximizes its likelihood given the TDOA estimates since the models compared in equation 1.33 may share the same $N_{fp}$ and $N_{TDOA}$.

Combination of Channels.

Two approaches are described below to combine the information between available channels and to perform Maximum A Posteriori (MAP).

Maximum (MAX).

In the Maximum (MAX) case, MAP (equation 1.6) may be performed across J channels as given by equation 1.35:

$$\arg\max_{i} P(\theta_i^j \mid \tau_l^j) \quad (1.35)$$

where $i = \{1, \ldots, N_{spk}\}$ and $j = \{1, 2, \ldots, J\}$.

Average (AVG).

In the Average (AVG) case, MAP (equation 1.6) may be performed over the average of J channels as given by equation 1.36:

$$\arg\max_{i} \sum_{j=1}^{J} \frac{1}{J} P(\theta_i^j \mid \tau_l^j) \quad (1.36)$$

where $i = \{1, \ldots, N_{spk}\}$.

HMM.

Figure 8:
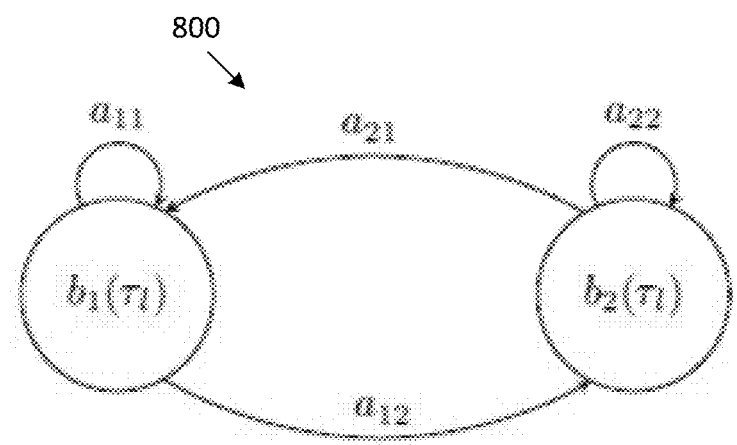
FIG. 8 depicts HMM architecture according to one or more illustrative aspects described herein.

FIG. 8 depicts HMM architecture according to one or more illustrative aspects described herein. A Hidden Markov Model (HMM) 800, as shown in FIG. 8, may be implemented in order to avoid extremely short utterances from one audio source (see "Modeling duration in a hidden markov model with the exponential family" by C. Mitchell). For example, each state of the HMM may represent one audio source. In this example, the transition probabilities $a_{qr}$ and observation probabilities $b_q$ may be computed as given by equation set 1.37:

$$a_{12} = a_{21}$$

$$a_{11} = 1 - a_{12}$$

$$a_{22} = 1 - a_{21}$$

$$b_1(\tau_l) = P(\theta_1^v | \tau_l)$$

$$b_2(\tau_l) = P(\theta_2^v | \tau_l) \quad (1.37)$$

where $a_{21}$ may be computed as the ratio of the TDOA frame increment over the average speaker duration. In one example, an approximate average speaker duration of 2.5 s (see "Speaker diarization: a review of recent research" by X. Anguera Miro) and the TDOA frame increment of 62.5 ms may be assumed. In this example, $a_{21} = 0.025$. This ratio may be derived from the fact that the number of steps in the same state is geometrically distributed (see Tutorial on structured continuous-time markov processes" by C. R. Shelton) and its expected value is $1/(1-a_{qq})$. Therefore $1/(1-a_{qq})$ may be set to be the average speaker duration in frames. For $N_{spk} > 2$, all the states may still be interconnected and the $1/(1-a_{qq})$ may still be computed as the average speaker duration in frames. In this example, $a_{qr} = (1-a_{qq})/(N_{spk}-1)$.

Thus, the speaker estimate label at frame 1 may be extracted by applying the Viterbi algorithm (which may be given by equation 1.38):

$$\arg\max_i \delta_i(l) \quad (1.38)$$

where $$\delta_r(l) = \max_q \delta_q(l-1) a_{qr} b_r(\tau_l),$$

$$\delta_q(1) = \pi_q b_q(\tau_1),$$

and where $\pi = \{\pi_1, \ldots, \pi_{N_{spk}}\}$ may comprise the initial state probabilities.

Confidence Measure.

A confidence measure $CM_l$ may indicate the reliability of the estimated speaker index at the time instant l, and may be computed directly from problem formulation (which may be given by equation 1.6), via equation 1.39, as $$CM_l = \max P(\theta_i | \tau_l) \quad (1.39)$$

where $i = \{1, \ldots, N_{spk}\}$ and $P(\theta_i | \tau_l)$ may be computed depending on the strategy followed to select or combine the channels.

Additionally, expressions such as equation 1.33 or equation 1.35 may be used to select the microphones with the a priori best speech signal by finding the j that maximized these expressions.

Experimental Setup.

Figure 9:
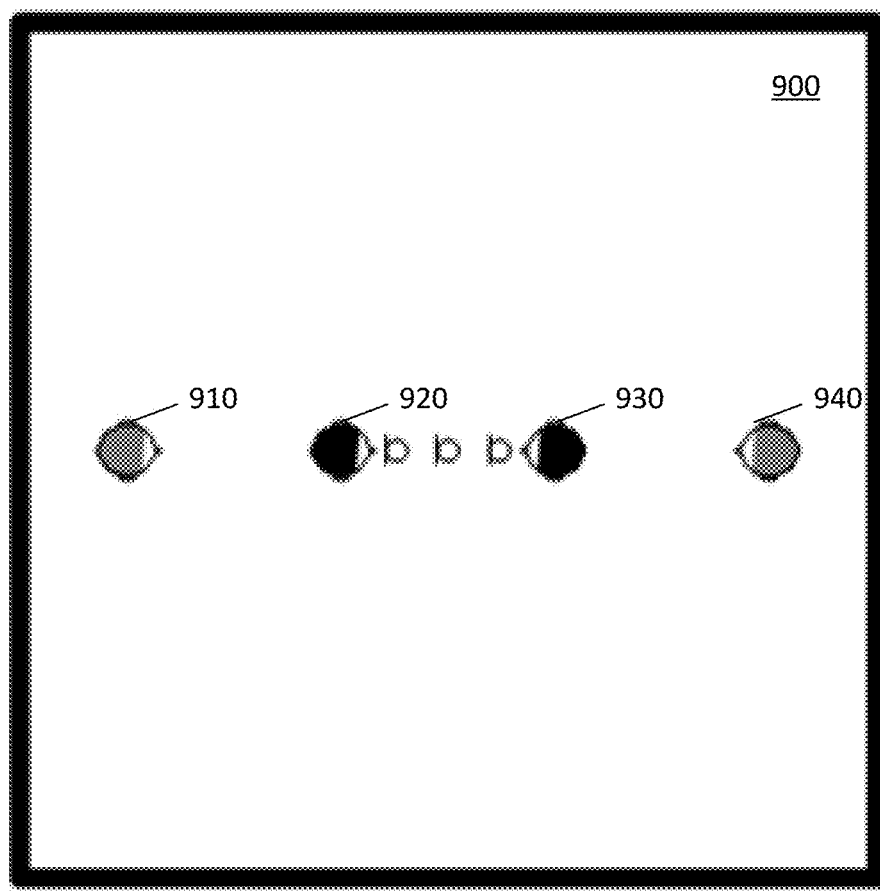
FIG. 9 depicts a simulated room indicating the positions of the microphones and audio sources according to one or more illustrative aspects described herein.

FIG. 9 depicts a simulated room 900 indicating the positions of the microphones and audio sources according to one or more illustrative aspects described herein. Microphones may at fixed locations or at ad hoc locations, and audio sources may be in multiple locations which are represented by audio sources 910, 920, 930, 940.

In one example, the simulated room 900 may comprise a doctor's office. Audio source 910 may be a doctor and another audio source, such as audio source 940, may be a patient. Microphones may be distributed around the room 900. In this example, to achieve a robust ASR performance, the best microphone channel may be selected to use for ASR. Received audio may be segmented to distinguish between the doctor's speech and the patient's speech. The methods described above may be used to detect the most reliable microphone pair and to robustly segment the audio, labeling it with who spoke and when. This method may not require knowledge of the microphone positions.

In another example the simulation may comprise a meeting, wherein the audio sources may comprise participants in the meeting. Each participant may bring his or her own smartphone to the meeting, and using an audio recording application, record the meeting. At the end of the meeting, the audio recording application may use the spatial information to select the best microphone signals for performing ASR and segmentation. The methods described above may be used to help identify the best microphone pair in spontaneous multi-party meetings with smartphone front-ends. The best microphone pair may correspond to multiple microphones of a single smartphone or a combination of microphones from different smartphones. As mentioned above, the method described may not require calibrated microphones or any special arrayed configuration of the microphones.

Two different databases may be considered to evaluate the method described above: an artificial database comprising simulated meeting scenarios and a real database comprising recordings extracted from real meetings.

Simulated Room Impulse Responses.

The artificial database may be designed to test the performance of the presented method under different controlled environments, e.g., microphones/audio sources positions or reverberation level. In one example, the main characteristics of this database may comprise:

Two different female speakers.
Total recording length of 28 s.
Ten different utterances are included, five from each speaker.
No additional noise.
In order to create a recording that represents conversational speech three utterances out of the ten utterances, are short: 0.26 s, 0.17 s, and 0.45 s.
FIG. 9 shows the setup used. The dimensions of the room and the position of audio sources and microphones are displayed in FIG. 10.

FIG. 10 depicts a table indicating the setup configurations 1000 according to one or more illustrative aspects described herein. Setup configurations 1000 correspond to the positions of the audio sources 910, 920, 930, 940 and microphones in FIG. 9. The values within the squared brackets represent x, y, and z values. In this example, there may be two positions for each of the audio sources 910, 920, 930, 940, whereas the microphone positions and room size may be fixed. As indicated above, the room may comprise a conference room or a doctor's office. In another example, there may be multiple positions for each audio source, the room size may be fixed, and the microphone may be in ad hoc locations. In this example, the microphones may comprise smartphone microphones.

FIG. 11 depicts a table assigning a label to each evaluation condition according to one or more illustrative aspects described herein. The values of three room acoustic parameters 1100, Reverberation time ($T_{60}$), Clarity index ($C_{50}$) and Direct-to-Reverberation-Ratio (DRR), for setup are displayed in FIG. 11.

Real Meeting Corpus.

The real database comprises the conference room meetings from RT-05 Evaluation Corpora (see "The rich transcription 2005 spring meeting recognition evaluation" by J. G. Fiscus). This corpora is part of the National Institute of Standards and Technology transcription series launched to promote and improve speech research tools. The meetings included in this corpus provide real scenarios with highly interactive discussions between multiple audio sources. The algorithm, in this improved system, is evaluated on the multi distant microphones, which may be placed on a table between the audio sources. This may provide a flexible configuration because the microphones may be placed anywhere in the room. This may also present a challenging scenario (see "The rich transcription 2005 spring meeting recognition evaluation" by J. G. Fiscus).

FIG. 12 depicts the details 1200 of the recordings used in this evaluation according to one or more illustrative aspects described herein. There are in total ten recordings from different sites including AMI (Augmented Multi-party Interaction project), CMU (Carnegie Mellon University Interactive Systems Laboratory), ICSI (International Computer Science Institute), NIST (National Institute of Standards and Technology), and VT (Virginia Tech). The length of this evaluation set is approximately 2 hours, 12 minutes per recording.

Evaluation.

The approaches presented are analyzed and compared to the baselines introduced above in terms of speaker time error.

Results.

Simulated Room Impulse Responses.

In the artificial setup described above with regards to FIG. 9, a time analysis window of 15 s with 50% overlap may be used for the local modelling.

Figure 13:
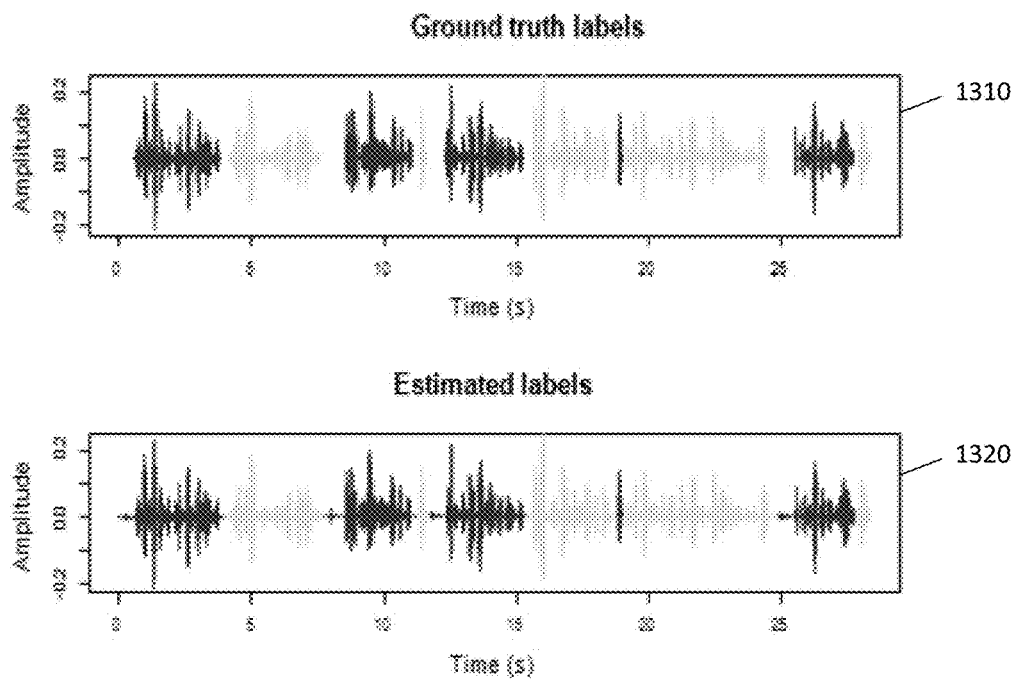
FIG. 13 depicts an example of diarization results according to one or more illustrative aspects described herein.

FIG. 13 depicts an example of diarization results 1310, 1320 according to one or more illustrative aspects described herein. Blue and yellow segments represent different audio sources. Blank spaces in the ground truth (top plot) represent silences. FIG. 13 shows the waveform of the simulated recording for $R_1S_1$ and the diarization result using MAX. In this simulated case the diarization is performed without any errors, assuming perfect voice activity detection.

Figure 14:
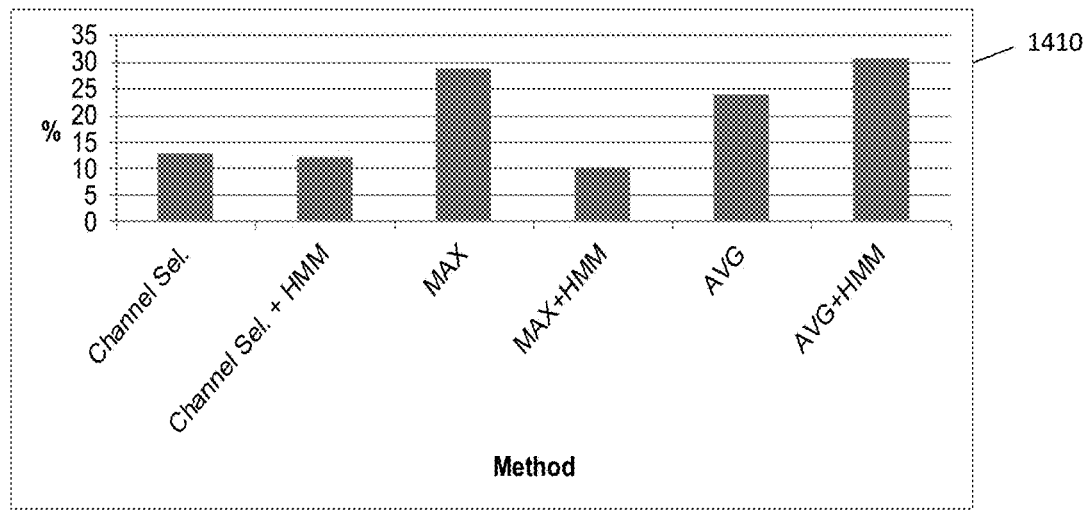
FIG. 14 depicts a comparison of the average speaker error achieved according to one or more illustrative aspects described herein.

FIG. 14 depicts a comparison of the average speaker error achieved according to one or more illustrative aspects described herein. FIG. 14 shows the speaker error 1410 achieved on average with the different approaches presented and the OG baseline. When applying the approaches in this section, lower errors are obtained. The best performance is achieved with the AVG+HMM method with a relative reduction in speaker error rate (RRDER %) of 30.8% lower than the baseline. Thus, the improved method outperforms on average the OG baseline even though it may not assume any specific position of the microphones and it may be employed in scenarios with more than two audio sources.

Real Meeting Corpus.

For the real evaluation set, the audio sources may be still. Thus, in order to optimize the results, the time analysis window may comprise the size of the whole recording. Thus local modelling may not be performed. Moreover, in this example, these results are obtained using the maximum number of audio sources, e.g., ten, due to limitations of an open source diarization tool when setting the correct number of audio sources. In the case of the improved system described above, the number of audio sources is set to ten for the test recordings. Likewise, in this example, the maximum number of audio sources is set to ten in the open source diarization tool system. Thus both systems may be compared under the same test conditions.

Figure 15:
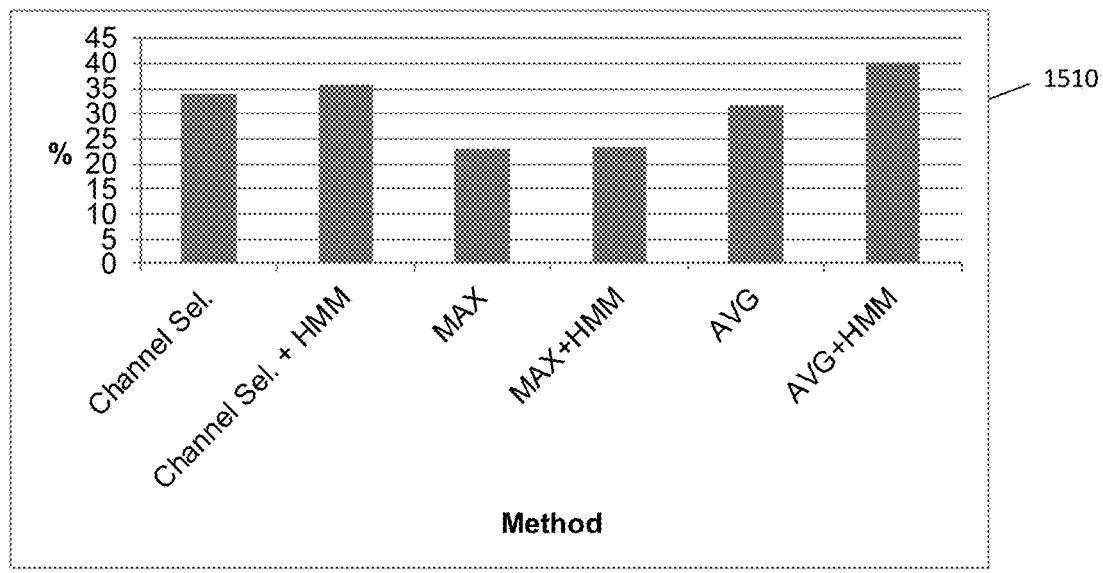
FIG. 15 depicts a relative reduction in DER (RRDER (%)) achieved with the different approaches on the RT05 database according to one or more illustrative aspects described herein.

FIG. 15 depicts a comparison of the average RRDER achieved with the different approaches on the RT05 database according to one or more illustrative aspects described herein. FIG. 15 shows the RRDER rates 1510 achieved on average with the baseline, e.g., an open source diarization tool, and with the different approaches discussed in this work. FIG. 15 indicates firstly that the baseline open source diarization tool provides, on average, worse performance than any of the approaches discussed. Secondly, the best approach on this evaluation set is achieved with the AVG+ HMM approach, which results in a RRDER % of 40.2% when compared to the baseline open source diarization tool. Thirdly, the incorporation of HMM into the system tends to improve the performance.

The open source diarization tool may estimate the number of audio sources internally through an agglomerative process. Thus it may try to reduce iteratively the maximum number of audio sources set to ten until the optimal is reached. The improved method does not attempt to reduce the number of audio sources and consequently it builds ten Gaussian models per TDOA stream available in the recordings. By setting the correct number of audio sources in latter method, the RRDER increases to 56.7% below the baseline. This outcome suggests that the improved method may not be extremely sensitive to an overestimation of the number of audio sources.

Figure 16:
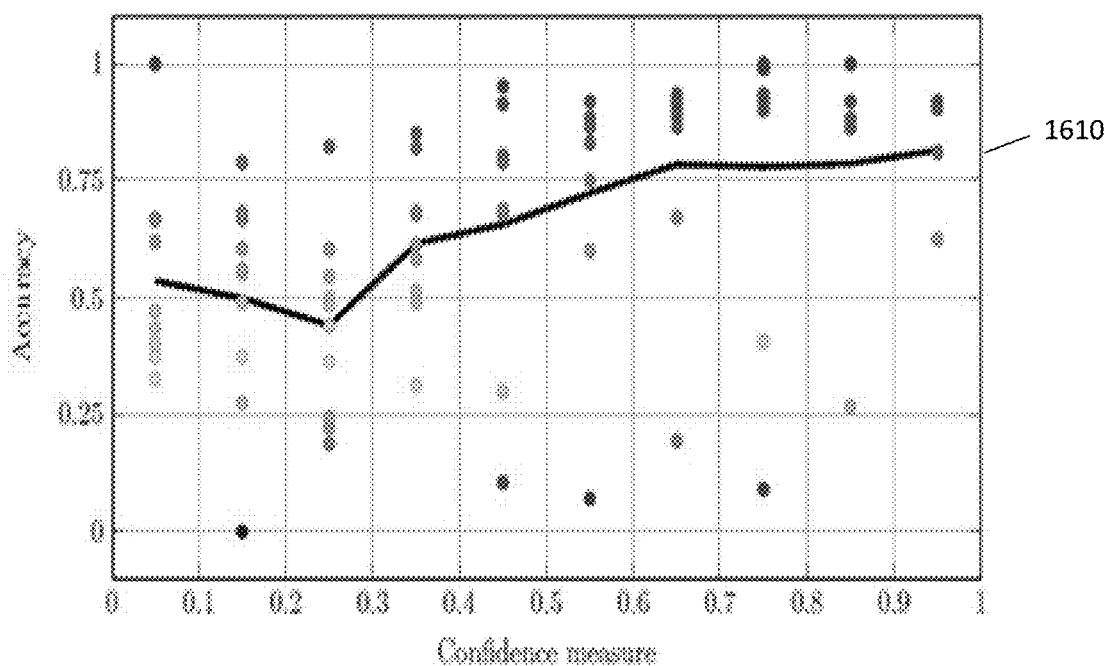
FIG. 16 depicts the accuracy of speaker label estimations grouped according to the confidence measure range according to one or more illustrative aspects described herein.

FIG. 16 depicts the accuracy of speaker label estimations grouped according to the confidence measure range according to one or more illustrative aspects described herein. Different points represent the accuracy achieved in the different RT05 recordings. The black line represents the average of these points per confidence measure range. FIG. 16 shows the confidence measures 1610 obtained with AVG+HMM, assuming the exact number of audio sources is known, against the speaker label estimation accuracy. This accuracy is computed per confidence measure band and for the ten different recordings in RT05. In this example, the width of the confidence measure band is set to 0.1. Additionally, the average of these points is computed and is represented with a black line. It shows an upward trend in the confidence measure as the accuracy increases. On average the accuracy of the estimation with a confidence lower than 0.5 is 55% while the estimations with a confidence higher than 0.5 provide 77% accuracy.

FIG. 17 depicts overall diarization results according to one or more illustrative aspects described herein. The overall diarization results 1710 result from using the MREC frame dropper voice activity detection (VAD). These overall diarization results 1710 reflect the end-to-end diarization results from RTDOA, and an existing method. Overall diarization results 1710 reflect a combination of RTDOA with MFCC features in second stage clustering and segmentation.

The RTDOA method in combination with MFCC features may reduce the overall DER, and may yield the relative reductions depicted in FIG. 17 when compared to existing technology for speaker clustering and segmentation.

CONCLUSIONS

Methods to perform diarization based on modelling spatial features, e.g., TDOA estimates, in an unsupervised manner with specific constraints have been described herein.

One or more methods outperform a known method, e.g., an open source diarization tool, under the same test conditions. Furthermore, this method has also been evaluated on real meeting recordings from RT05 where it reduces the speaker error rate of the baseline open source diarization tool (40.2% relative error reduction). Further reduction of the improved method has been achieved by employing the exact number of audio sources in each recording. In this case, the RRDER % is 56.7. The number of audio sources in a recording may potentially be estimated with external algorithms (see "Determining the number of speakers in a meeting using microphone array features" by E. Zwyssig).

Additionally, confidence measures of the speaker estimations show that the a posteriori probability extracted from the improved method is related to the accuracy of the estimations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving a plurality of audio signals, wherein each audio signal of the plurality of audio signals is received by one or more pairs of a plurality of microphones;
    determining a time delay of arrival (TDOA) for each audio signal corresponding to a difference in receipt time of the plurality of audio signals for the one or more pairs of the plurality of microphones;
    clustering the TDOAs to be associated with one of an audio source and interference, resulting in clustering information, wherein at least one TDOA is associated with the audio source and at least one TDOA is associated with the interference; and
    segmenting each audio signal of the plurality of audio signals received by the one or more pairs of the plurality of microphones using the clustering information resulting from clustering the TDOAs to identify the audio source.

2. The method of claim 1, wherein the plurality of microphones comprises at least three microphones, the method further comprising:
    performing the clustering for possible pairs of the at least three microphones, resulting in additional clustering information;
    generating, based on the additional clustering information, a confidence measure per possible pair of the at least three microphones; and
    selecting, based on the confidence measure, one of the possible pairs of microphones.

3. The method of claim 2, wherein the confidence measure is determined by:

$$CM_i = \max P(\theta_i | \tau_i),$$

where $i = \{1, \ldots, N_{spk}\}$, and
where $P(\theta_i | \tau_i)$, is determined based on a channel selection strategy.

4. The method of claim 1, wherein the clustering is performed using statistical models.

5. The method of claim 4 wherein the statistical models comprise a Gaussian mixture model (GMM).

6. The method of claim 5 wherein a plurality of input parameters to the GMM are determined at each small time analysis window of a plurality of small time analysis windows and wherein the GMM is determined by:

$$\arg\max_{\theta^v} \log \mathcal{L}(\theta^v | \tau^v),$$

where $$v = \left\{1, 2, \ldots, \left\lceil \frac{N_{TDOA} - (N_w - N_o)}{N_o} \right\rceil \right\},$$

$$\tau^v = \{\tau_{(v-1) \cdot (N_w)+1}, \tau_{(v-1) \cdot (N_w)+2}, \ldots, \tau_{(v-1) \cdot (N_w)+N_w}\},$$

wherein $N_o$ comprises a number of overlapped frames,
wherein $v$ represents one of the small time analysis windows, and
wherein $N_w$ comprises a length of each small time analysis window.

7. The method of claim 4, wherein the statistical models are trained using conditional expectation-maximization.

8. The method of claim 7, further comprising applying linear constraints on a plurality of means, wherein at least a first mean of the plurality of means is associated with a speaker model and at least a second mean of the plurality of means is associated with a noise model, and wherein the linear constraints are determined by:

$$\begin{bmatrix} \mu_B \\ \mu_1 \\ \mu_2 \\ \vdots \\ \mu_{N_{spk}} \end{bmatrix} = \begin{bmatrix} 1 & 0 \\ 0 & 1 \\ 0 & 1 \\ \vdots & \vdots \\ 0 & 1 \end{bmatrix} \cdot \begin{bmatrix} \beta_1 \\ \beta_2 \end{bmatrix} + \begin{bmatrix} 0 \\ 0 \\ C_2 \\ \vdots \\ C_{N_{spk}} \end{bmatrix},$$

$$\mu_B = \beta_1,$$
$$\mu_1 = \beta_2,$$
$$\mu_2 = \beta_2 + C_2,$$
$$\ldots$$
$$\mu_{N_{spk}} = \beta_{N_{spk}} + C_{N_{spk}}.$$

9. The method of claim 8, further comprising determining $C_{N_{spk}}$ by:

$$C_{N_{spk}} = \tau_{maxN_{spk}} - \tau_{max1},$$

where, $$\tau_{max1} = \arg\max_\tau \left\{ p(\tau) \left| \frac{dp(\tau)}{d\tau} = 0 \right. \right\},$$

$$\tau_{maxN_{spk}} = \arg\max_\tau \left\{ p(\tau) \left| \frac{dp(\tau)}{d\tau} = 0 \text{ and} \right. \right.$$

$$\left. \tau \neq \{\tau_{max1}, \tau_{max2}, \ldots, \tau_{max(N_{spk}-1)}\} \right\},$$

$$p(\tau) = \frac{1}{N_{TDOA}} \sum_{l=1}^{N_{TDOA}} \frac{1}{\sigma} \mathfrak{K}\left(\frac{\|\tau - \tau_l\|}{\sigma}\right) = \frac{1}{N_{TDOA}} \sum_{l=1}^{N_{TDOA}} \frac{1}{(2\pi\sigma^2)^{1/2}} e^{-\frac{\|\tau - \tau_l\|^2}{2\sigma^2}},$$

$$\sigma^* = 0.9 N^{-1/5} \cdot \min(\sigma, IQR/1.34),$$

wherein $\sigma$ comprises a standard deviation, and
wherein IQR comprises an interquartile range computed from input data $\tau$.

10. The method of claim 7, further comprising applying linear constraints to a plurality of standard deviations, wherein at least a first standard deviation of the plurality of standard deviations is associated with a speaker model and at least a second standard deviation of the plurality of standard deviations is associated with a noise model, and wherein the linear constraints are determined by:

$$\begin{bmatrix} 1/\sigma_B \\ 1/\sigma_1 \\ 1/\sigma_2 \\ \vdots \\ 1/\sigma_{N_{spk}} \end{bmatrix} = \begin{bmatrix} \iota_B \\ \iota_1 \\ \iota_2 \\ \vdots \\ \iota_{N_{spk}} \end{bmatrix} = \begin{bmatrix} 1 & 0 \\ 1 & 1 \\ 1 & 1 \\ \vdots & \vdots \\ 1 & 1 \end{bmatrix} \cdot \begin{bmatrix} \Upsilon_1 \\ \Upsilon_2 \end{bmatrix},$$

$\sigma_B = 1/\Upsilon_1$,
$\{\sigma_1, \sigma_2, \ldots, \sigma_{N_{spk}}\} = 1/\Upsilon_1 + 1/\Upsilon_2$.

11. The method of claim 1, wherein at least one microphone of the plurality of microphones is placed at an ad hoc location.

12. The method of claim 11, wherein the at least one microphone of the plurality of microphones comprises a mobile device.

13. The method of claim 1, wherein the interference comprises background noise.

14. The method of claim 5 further comprising determining a speaker index that maximizes an a posteriori probability (MAP) of each GMM based on the TDOA, and wherein the MAP is maximized by:

$$\arg\max_i P(\tau_l | \theta_i) \cdot P(\theta_i).$$

15. A method comprising:
receiving a plurality of audio signals, each received by one or more pairs of a plurality of microphones;
determining a time delay of arrival (TDOA) for each audio signal corresponding to a difference in receipt time of the plurality of audio signals by the one or more pairs;
determining, based on the TDOAs, one or more Gaussian mixture models (GMM) for each microphone pair of the one or more microphone pairs of the plurality of microphones;
determining a speaker index that maximizes an a posteriori probability (MAP) associated with the GMM; and
selecting, based at least in part on the MAP, a microphone pair of the one or more pairs of the plurality of microphones.

16. A method comprising:
receiving a plurality of audio signals by one or more pairs of a plurality of microphones;
determining a time delay of arrival (TDOA) for each audio signal corresponding to a difference in receipt time of the plurality of audio signals at the one or more pairs;
determining, without supervision and based on the TDOAs, a Gaussian mixture model (GMM) for each microphone pair of the one or more microphone pairs of the plurality of microphones;
determining a speaker index that maximizes an a posteriori probability (MAP) associated with the GMM; and
selecting, based at least in part on the MAP, a microphone pair of the one or more pairs of the plurality of microphones.

17. The method of claim 16, wherein the determining the GMM further comprises clustering the TDOA to be associated with an audio source, resulting in clustering information, wherein at least one TDOA is associated with speech and at least one TDOA is associated with background noise.

18. The method of claim 17 further comprising:
performing the clustering for additional pairs of microphones, resulting in additional clustering information;
generating a confidence level for the additional pairs of microphones based on the additional clustering information; and
selecting, based at least in part on the confidence level, the microphone pair of the one or more microphone pairs of the plurality of microphones.

19. The method of claim 17 further comprising segmenting, based on the clustering, the plurality of audio signals to identify the audio source at regular intervals.

20. The method of claim 18, wherein the confidence level is determined by:

$CM_l = \max P(\theta_i | \tau_l)$, where $i = \{1, \ldots, N_{spk}\}$, and
where $P(\theta_i | \tau_l)$ is determined based on a channel selection strategy.

* * * * *